G. STARKWEATHER.
APPARATUS FOR CURING MEAT.
No. 7,766.   Patented Nov. 5, 1850.
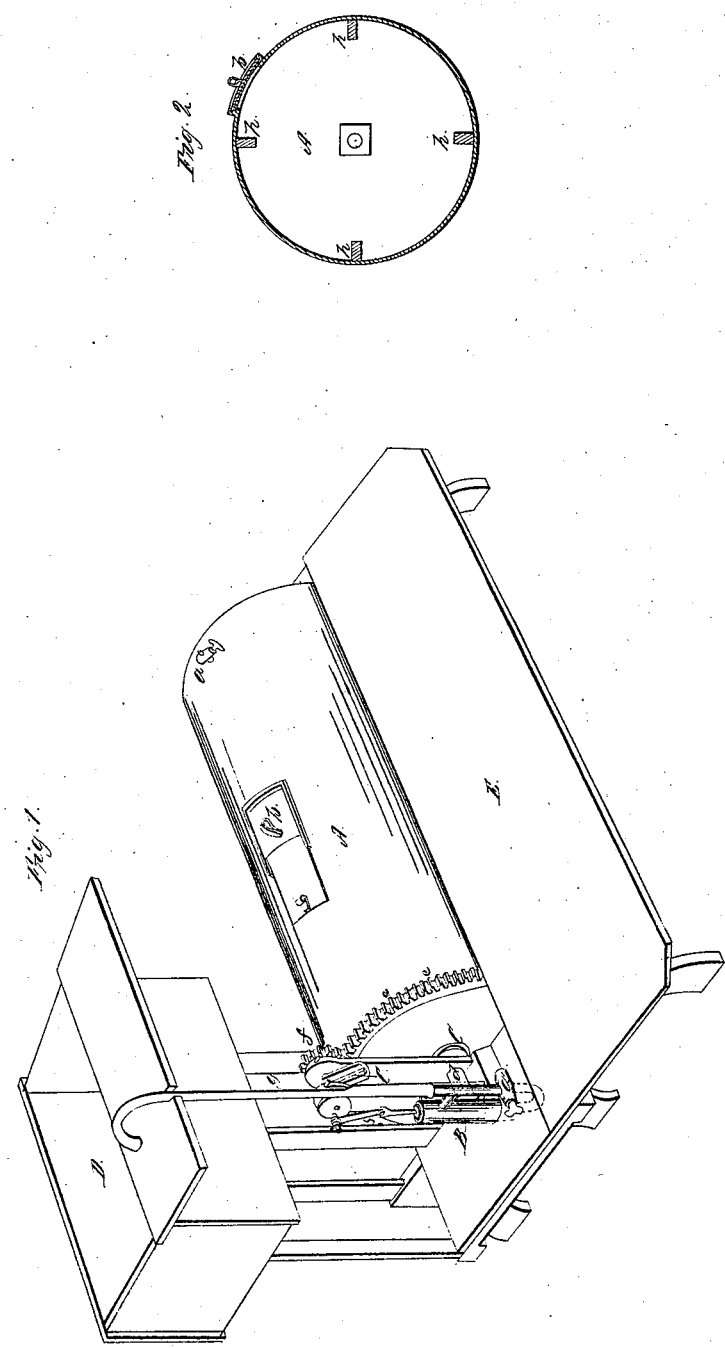

UNITED STATES PATENT OFFICE.

GEO. STARKWEATHER, OF HARTFORD, CONNECTICUT.

PROCESS FOR CURING MEAT.

Specification of Letters Patent No. 7,766, dated November 5, 1850.

*To all whom it may concern:*

Be it known that I, GEORGE STARKWEATHER, of the town and county of Hartford and State of Connecticut, have invented certain new and useful Improvements in the Methods of Curing Meat, of which the following is a full, clear, and exact description, reference being had to the accompanying drawing, which forms part of this specification, and in which—

Figure 1, represents a view in perspective of the apparatus employed by me to carry my invention into effect, and Fig. 2 is a transverse section of the turning vessel.

My invention consists in subjecting the meat in brine to the joint action of atmospheric pressure and agitation; this is effected by introducing the meat and brine into a turning vessel within which the pressure of the atmosphere is alternately removed by an exhaust pump and reapplied as often as may be necessary to effect the curing of the meat.

The apparatus employed by me for this purpose consists of a close cylindrical vessel or drum A fitted with a man hole $b$, for the introduction and discharge of the materials and with a stop cock $a$ by which the air in the vessel is allowed to escape when displaced by the brine introduced. The cylinder A is suspended at each extremity by gudgeons $c$ secured to the centers of its heads. One of these gudgeons is solid, the other is tubular; from the latter a suction pipe $d$ proceeds to a pump B by means of which the pressure of the atmosphere is removed from the interior of the cylinder. That extremity of the cylinder nearer the pump is surrounded by a toothed rim $e$ whose teeth engage with those of a pinion $f$ on the crank shaft C of the pump; this shaft is also bent to form a crank to which the driving power is applied. In the apparatus thus represented and described the pump is for the purpose of exhausting the brine; it communicates with the interior of the cylinder through the tubular journal, and with a brine cistern D by means of a pipe $g$; the latter also communicates with the suction pipe of the pump, the connection between the two being made or broken at will by a stop cock $a'$. The interior of the vessel A is fitted with lifters $h$ which carry up the meat as the vessel is turned. In putting up the apparatus a suitable staging E should be erected to facilitate the charging and discharging of the meat.

The first operation necessary with this apparatus is to make a strong solution of brine; this I effect by introducing salt and water into the cylinder, closing the manhole and stop cocks, and creating a vacuum by turning the crank shaft which at the same time pumps out a portion of the liquid and agitates the materials; when a sufficient quantity of salt has been dissolved the air stop cock $a$ is opened and the brine is pumped off into the cistern. The man hole is then opened and the meat to be cured is charged into the vessel; the man hole is now closed and the stop cock $a'$ is opened to admit the brine which displaces the air in the cylinder, and drives it through the air cock $a$. The stop cocks $a$, $a'$, are then closed and power is applied to turn the crank shaft, as the latter turns it effects two purposes; first, by turning the pump crank it exhausts the brine from the cylinder and pumps it into the cistern, and second, by means of the pinion it turns the cylinder on its journals; by this last operation the lifters $h$ gradually raise the meat from the bottom of the vessel and carrying it upward allow it to drop into the brine, thus thoroughly agitating the whole mass and exposing each piece of meat to the action of the vacuum produced by the exhaustion of the brine. When a sufficient vacuum has been produced, the motion of the crank shaft is stopped and the connection is made between the brine cistern and interior of the cylinder by opening the brine cock; the brine thereupon rushes into the cylinder under the pressure of the atmosphere, and fills up the pores of the meat from which the air and juices have been exhausted by the action of the vacuum; the air accumulates at the top of the cylinder from which it is allowed to escape by opening the air cock $a$; whereupon the vessel is refilled with brine the exhaustion and turning are resumed, the several operations being continued until the meat is thoroughly cured. It is advisable to have the brine always saturated with salt, and this is insured by introducing a quantity of salt into the cylinder with the meat.

I have thus far described the vacuum as produced by the exhaustion of the brine but it is obvious that the same effects will be produced by the exhaustion of the air from the vessel; in the latter case an air pump must be substituted for a brine pump, and its suction pipe must be carried through the tubular journal and bent upward to the uppermost part of the vessel.

I make no claim to the curing of meat by mere agitation in brine; nor to the saturation of meat with brine by alternately withdrawing and reapplying the pressure of the atmosphere without at the same time agitating the meat; but What I do claim as my invention and desire to secure by Letters Patent—

The method of curing meat by placing it with brine within a vessel and then subjecting it to the combined action of agitation and an alternate increase and diminution of atmospheric pressure substantially as herein set forth.

GEORGE STARKWEATHER.

Witnesses:
 JAMES H. HOLCOMB,
 DAVID GREENLEAF.